United States Patent
Kikuchi

(10) Patent No.: US 6,970,472 B2
(45) Date of Patent: *Nov. 29, 2005

(54) DATA PROCESSING APPARATUS AND METHOD AND COMPUTER READABLE STORAGE MEDIUM

(75) Inventor: Takayuki Kikuchi, Takanezawa-machi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/314,122

(22) Filed: May 19, 1999

(65) Prior Publication Data

US 2003/0137994 A1    Jul. 24, 2003

(30) Foreign Application Priority Data

May 22, 1998 (JP) ............................... 10-141630

(51) Int. Cl.⁷ ............................................ H04L 12/28
(52) U.S. Cl. .................. 370/395.64; 725/86
(58) Field of Search ....................... 370/395.1, 395.64, 370/395.65, 389, 470, 471, 474, 537, 538, 370/395.63; 348/14.13; 725/86, 90, 80

(56) References Cited

U.S. PATENT DOCUMENTS

| | | | |
|---|---|---|---|
| 5,801,781 A * | 9/1998 | Hiroshima et al. | 348/441 |
| 5,930,251 A * | 7/1999 | Murakami et al. | 370/395 |
| 6,014,368 A * | 1/2000 | Sanami | 370/242 |
| 6,333,950 B1 * | 12/2001 | Karasawa | 375/240.23 |

* cited by examiner

Primary Examiner—Duc Ho
Assistant Examiner—Thien D. Tran
(74) Attorney, Agent, or Firm—Fitzpatrick, Cella, Harper & Scinto

(57) ABSTRACT

A data processing apparatus and method and a computer readable storage medium storing data processing programs realizing the data processing method, capable of preventing transmission of unnecessary redundant data and efficiently utilizing a transmission path. In the data processing method, data is input, the data is compression-encoded, the encoded data is packetized into a first data train on a basis of a first data length, the generated first data train is packetized into a second data train on a basis of a second data length, and the first data length is controlled in accordance with the second data length.

2 Claims, 4 Drawing Sheets

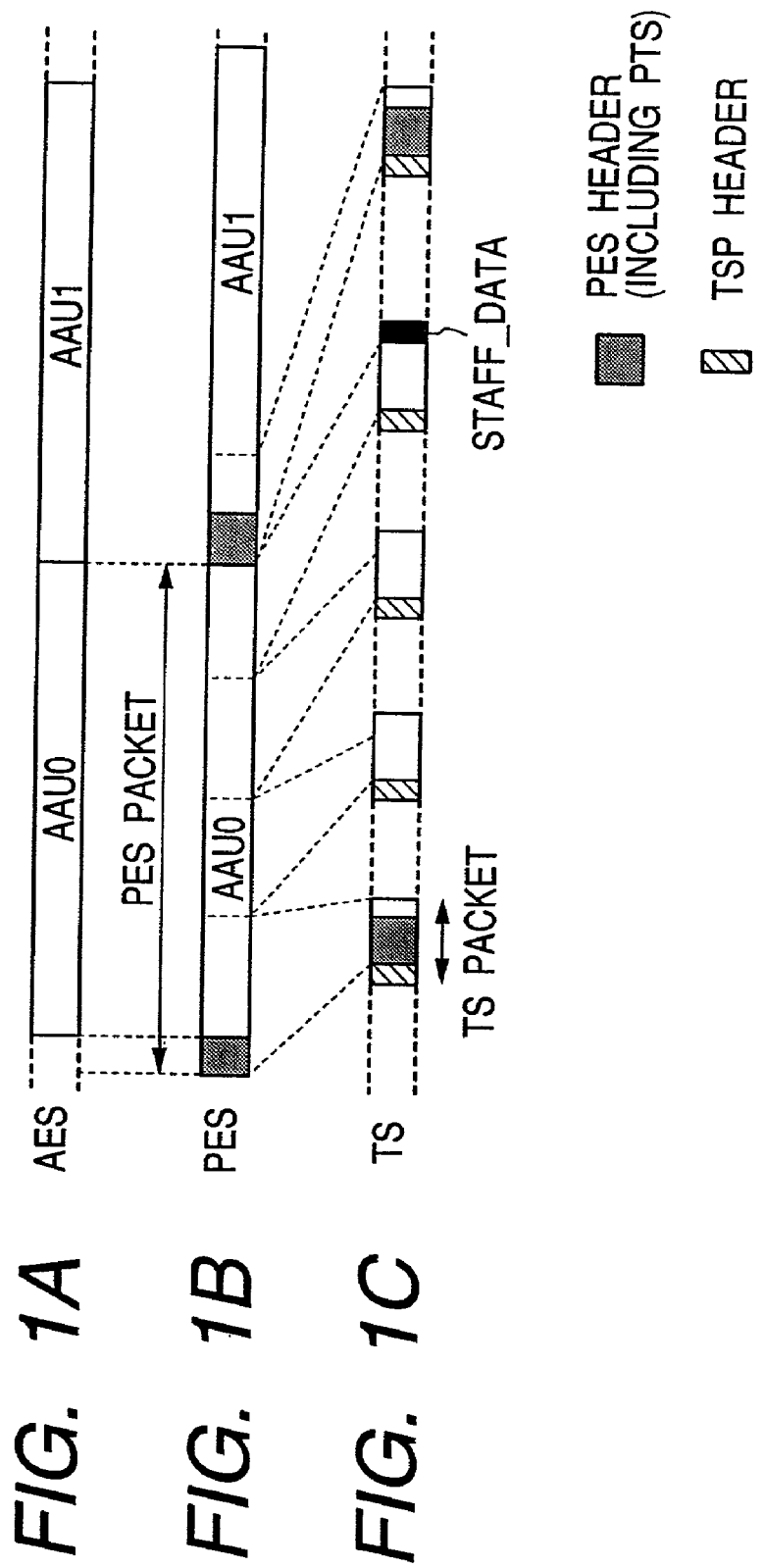

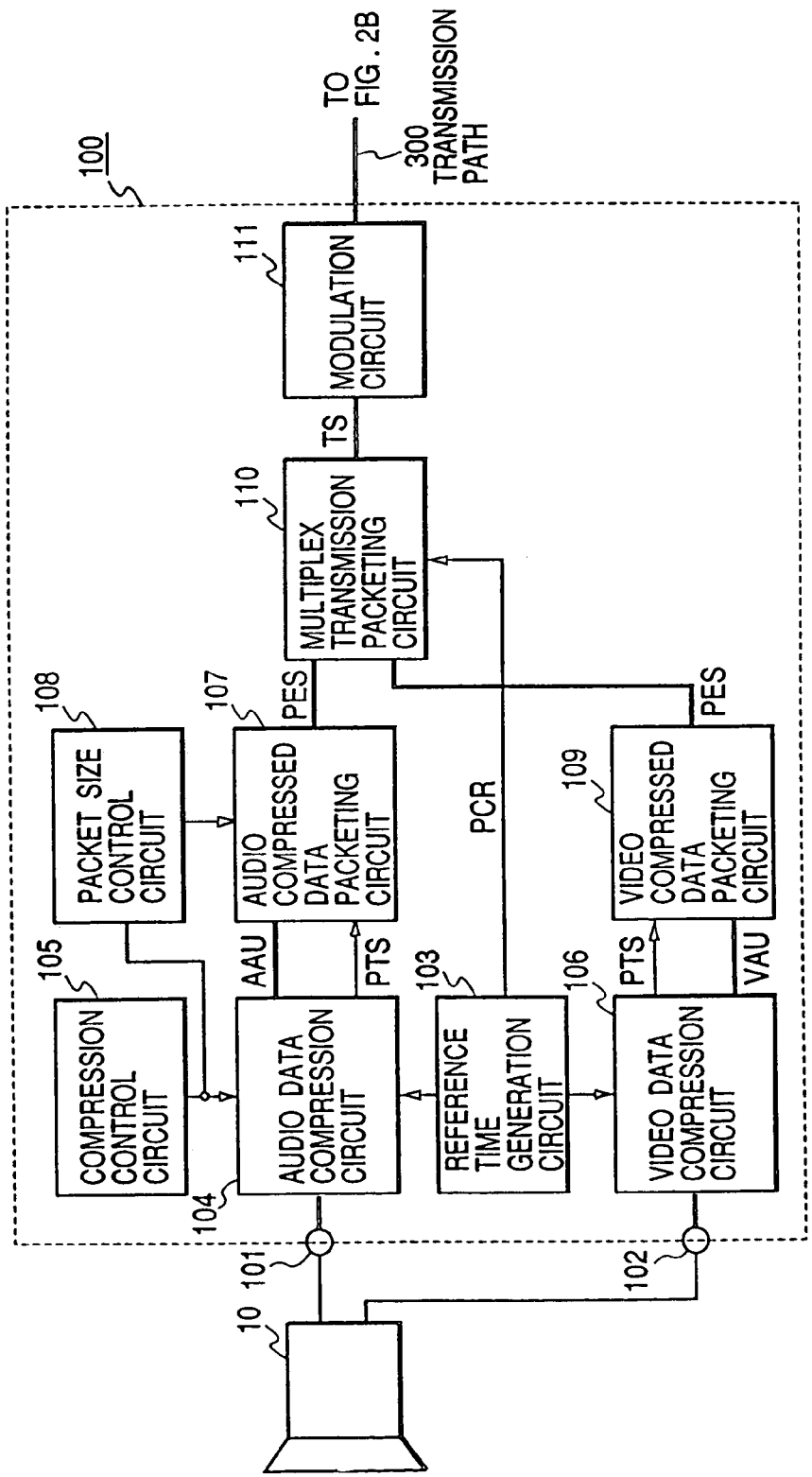

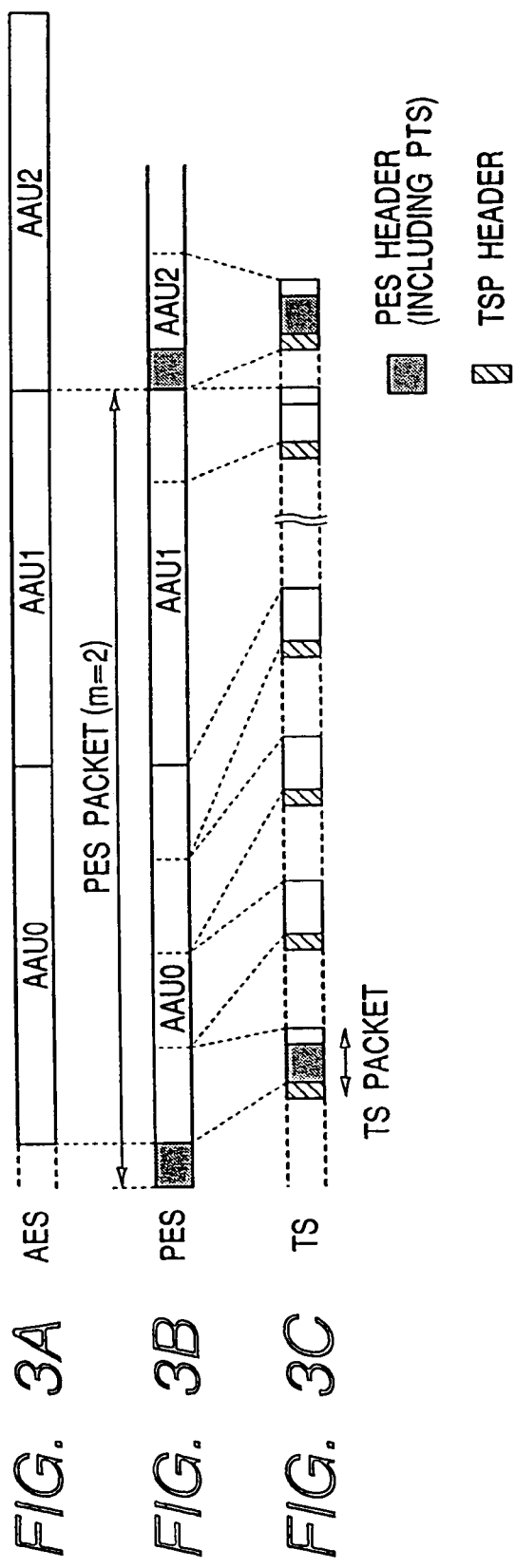

DATA PROCESSING APPARATUS AND METHOD AND COMPUTER READABLE STORAGE MEDIUM

BACKGROUND OF THE INVENTION

1. Field of the Invention

The present invention relates to a data processing apparatus and method for encoding, multiplexing and outputting digitalized video and audio data, and a computer readable storage medium storing data processing programs realizing the data processing method.

2. Related Background Art

As international standards for a coding system of video, audio and other data, JPEG (Joint Photographic Coding Experts Group), H. 261 and MPEG (Moving Picture Coding Experts Group) which is an improved version of JPEG and H. 261 are known.

In the present days called a multimedia period collectively dealing with video, audio and other data, MPEG-1 as improved MPEG and further MPEG-2 as improved MPEG-1 are adopted.

Of these specifications, MPEG-2 is specifications which are recommended for transmitting video, audio and other data at a high quality in a limited transmission band. Equipments compatible with the specifications of MPEG-2 are in the main stream. For example, with MPEG-2, not only a desired number of respective encoded streams of video, audio and other data can be multiplexed into one stream (PS: Program Stream) as a set of programs, but also a plurality of programs can be constituted as one stream (TS: Transport Stream).

In a digital transmission apparatus compatible with the specifications of MPEG-2, an encoder unit of the apparatus encodes audio and video data and packetizes it into a PES (Packetized Elementary Stream which is again packetized into a TS packet and transmitted.

Packetizing will be specifically described by paying attention to audio data.

An audio data compression circuit of a digital transmission apparatus first compresses audio data in accordance with a predetermined scheme (e.g., ISO/IEC 11172-3), to form AAU's (Audio Access Units) each having a compression/expansion base unit and output an AES (Audio Elementary Stream) constituted of AAU's.

More specifically, as shown in FIG. 1A, AES constituted of AAU0, AAU1, . . . is output.

Next, as shown in FIG. 1B, AES is packetized in the unit of AAU, and a PTS (Presentation Time Stamp) is loaded in a header field (PES header) of each packet (PES packet). This packet as an audio PES is passed to the next process. According to ISO/IEC 13818-1, it stipulates that although it is not necessarily required to load PTS in each PES header, PTS is required to be loaded and transmitted at least once per 700 ms.

At the next process, as shown in FIG. 1C, each PES packet is further packetized into a transmission packet (TS packet) to make it have a fixed length size suitable for a transmission path. In order to make each packet have the same packet length, invalid data (staff data) is added if necessary as shown in FIG. 1C.

In a header field (TSP header) of a TS packet, a PID (Packet Identification) for identifying data (such as audio data and video data) stored in the packet, a PCR (Program Clock Reference) and the like are loaded. According to ISO/IEC 13818-1, it stipulates that although it is not necessarily required to load PCR in each TSP header, PCR is required to be loaded and transmitted at least once per 100 ms.

As above, audio data is transmitted as a TS packet.

AAU is the minimum unit which can be recovered independently, and is always constituted of data having a constant number of samples. Namely, AAU is constituted of data sampled during a predetermined period and having a fixed length preset for each compression factor.

PES including AAU's is packetized into each PES packet in the unit of AAU, and each PES packet is further packetized (divided) into a fixed length TS packet. In this case, it is not guaranteed that the data length of AAU, i.e., the data length of the PES packet, is an integer multiple of the data length of the TS packet. When each PES packet of PES is packetized and if the data of the PES packet is insufficient for the TS packet, the staff data is inserted into the last TS packet to make all TS packets have the same packet length.

As above, the data length of AAU (data length of the PES packet) has no definite relation to the data length of the TS packet and hence to the data length of the last TS packet. Therefore, the length of the staff data to be inserted so as to make the last TS packet have the fixed length is uncertain, which results in a reduction of the capacity of a transmission path.

SUMMARY OF THE INVENTION

Under the above-described background, it is an object of the present invention to provide a data processing apparatus and method capable of improving more than conventional an efficiency of a transmission path along which encoded data is transmitted, and a storage medium storing program software which executes the data processing method.

According to one preferred embodiment, a data processing method is provided which comprises the steps of: inputting data; compression-encoding the data; packetizing the encoded data into a first data train on a basis of a first data length; packetizing the generated first data train into a second data train on a basis of a second data length; and controlling the first data length at said first packetizing step in accordance with the second data length.

According to another preferred embodiment, a computer readable storage medium storing an image processing program is provided, the program comprising: an input step of inputting data; an encoding step of compression-encoding the data; a first packetizing step of packetizing the data encoded by said encoding step into a first data train on a basis of a first data length; a second packetizing step of packetizing the first data train generated by said first packetizing step into a second data train on a basis of a second data length; and a control step of controlling the first data length at said first packetizing step in accordance with the second data length.

Other objects, features and advantages of the invention will become apparent from the following detailed description taken in conjunction with the accompanying drawings.

BRIEF DESCRIPTION OF THE DRAWINGS

FIGS. 1A, 1B and 1C are diagrams illustrating packetizing of audio data.

FIGS. 3A, 3B and 3C are diagrams illustrating packetizing of audio data according to the invention.

DETAILED DESCRIPTION OF THE PREFERRED EMBODIMENTS

Figure 2B:
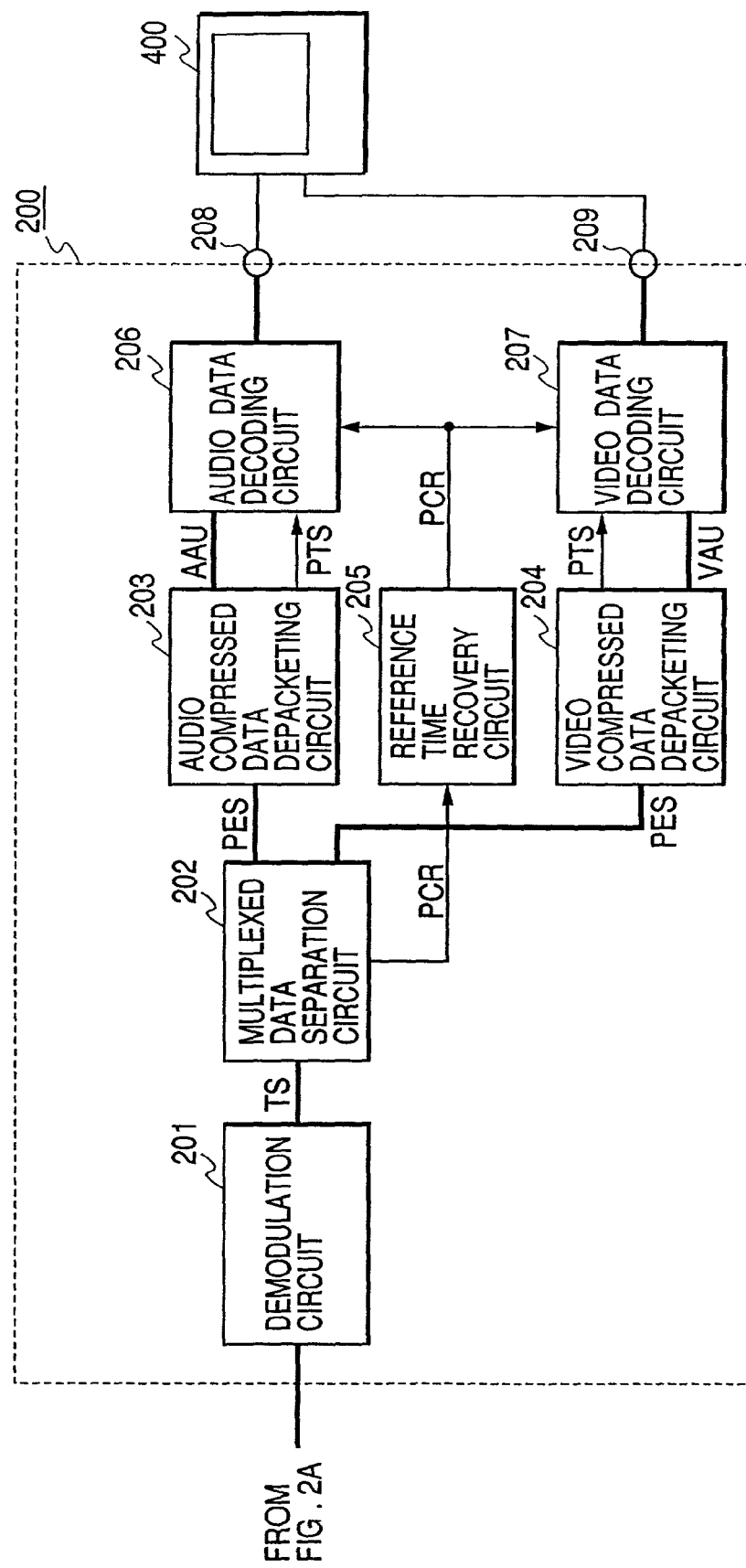
FIG. 2 is comprised of FIGS. 2A and 2B illustrating block diagrams showing the structure of a digital data transmission system according to an embodiment of the invention.

Embodiments of the invention will be described with the accompanying drawings.

FIGS. 2A and 2B are block diagrams showing the structure of a data processing system according to an embodiment of the invention.

This data processing system is a system compatible with the specifications of MPEG-2. As shown in FIGS. 2A and 2B, the data processing system includes a camera unit 10, an encoder unit 100, a decoder unit 200 and a monitor unit 400. Video and audio data taken with the camera unit 10 is supplied to the encoder unit 100. The encoder unit 100 compresses and encodes the video and audio data and then packetizes it. The packetized data is transmitted via a transmission path 300 to the decoder unit 200. The decoder unit 200 decodes the encoded video and audio data and the monitor 400 outputs decoded video and audio data.

The camera unit 10 supplies video data of an image taken with an unrepresented camera and audio data picked up with an unrepresented microphone to the encoder unit 100.

The encoder unit 100 has: an input terminal 101 to which audio data supplied from the camera unit 10 is applied; an input terminal 102 to which video data supplied from the camera unit 10 is applied; an audio data compression circuit 104 to be supplied with an output from the input terminal 101; a video data compression circuit 106 to be supplied with an output from the input terminal 102; a compressed audio data packeting circuit 107 to be supplied with an output from the audio data compression circuit 104; and a compressed video data packeting circuit 109 to be supplied with an output from the video data compression circuit 106.

The encoder unit 100 has also: a multiplex transmission packeting circuit 110 to be supplied with the outputs from the audio and video data packeting circuits 107 and 109; a modulation circuit 111 to be supplied with an output of the multiplex transmission packeting circuit 110; a compression control circuit 105 for controlling the compression to be executed by the audio data compression circuit 104; a reference time generation circuit 103 for generating and supplying timing signals to the audio data compression circuit 104, video data compression circuit 106 and multiplex transmission packeting circuit 110. An output of the modulation circuit 111 is supplied via a transmission path 300 to the decoder unit 200.

The decoder unit 200 has: a demodulation circuit 201 for receiving data from the transmission path; a multiplexed data separation circuit 202 for receiving data from the demodulation circuit 201; a compressed audio data depacketing circuit 203 and a compressed video data depacketing circuit 204 respectively receiving data from the multiplexed data separation circuit 202; a reference time recovery circuit 205; an audio data decoding circuit 206 to be supplied with outputs from the compressed audio data depacketing circuit 203 and reference time recovery circuit 205; and a video data decoding circuit 207 to be supplied with outputs from the compressed video data depacketing circuit 204 and reference time recovery circuit 205. An output of the audio data decoding circuit 206 is output via an output terminal 208, and an output of the video data decoding circuit 207 is output via an output terminal 209. Outputs from the output terminals 208 and 209 are supplied to the monitor unit 400 which outputs images and sounds.

The most characteristic structure of the digital transmission system described above is a packet size control circuit 108 provided in the encoder unit 100.

The packet size control circuit 108 controls the audio data compression circuit 108 which is controlled also by the compression control circuit 105, and also controls the compressed audio data packeting circuit 107.

A series of operations of the digital transmission system will be described first.

Audio and video data output from the camera unit 10 is applied to the input terminals 101 and 102.

In the encoder unit 100, analog audio data is applied to the input terminal 101, whereas analog video data is applied to the input terminal 102.

The reference time generator circuit 103 supplies the multiplex transmission packeting circuit 110 with a time of an audio signal input to the input terminal 101 and a time of a video signal input to the input terminal 102, as program clock reference (PCR) values. The reference time generation circuit 103 also supplies the audio and video signal compression circuits 104 and 106 with timing signals referenced to PCR.

The decoder unit 200 is required to synchronously decode audio and video data.

The audio and video data compression circuits 104 and 106 (an audio-video input processing series) define the times of their signal inputs by using the timing information representative of the common reference time (PCR) (timing signals generated by the reference time generation circuit 103). The defined times are used as time management information (PTS: Presentation Time Stamp). Namely, the audio and video data compression circuits 104 and 106 counts the sampled (or input) times of analog audio and video data by a 90 kHz counter called a PCR and supply representative values of the counts to the decoder unit 200, as PTS.

More specifically, the audio data compression circuit 104 converts analog audio data applied to the input terminal 101 into digital audio data and generates PTS indicating the sampling timings of the audio data, in accordance with the timing signals supplied from the reference time generation circuit 103. The audio data compression circuit 104 supplies the digital audio data and generated PTS to the compressed audio data packeting circuit 107.

The audio data compression circuit 104 encodes (compresses) the audio data by using correlation or the like and generates each audio access unit (AAU) having a compression/expansion base unit, under the control of the compression control circuit 105. The audio data compression circuit 104 supplies the compressed audio data packeting circuit 107 with an audio elementary stream (AES) constituted of generated AAU's.

In this case, the compression control circuit 105 controls a compression factor of the audio data compression circuit 104.

The video data compression circuit 106 converts analog video data applied to the input terminal 102 into digital video data and generates PTS indicating the sampling timings of the video data, in accordance with the timing signals supplied from the reference time generation circuit 103. The audio data compression circuit 106 supplies the digital video data and generated PTS to the compressed video data packeting circuit 109.

The video data compression circuit 106 encodes (compresses) the video data by using correlation or the like and generates each video access unit (VAU) having a compression/expansion base unit. The video data compression circuit 106 supplies the compressed video data packeting circuit 109 with a video elementary stream (VES) constituted of generated VAU's.

The compressed audio data packeting circuit 107 packetizes AES supplied from the audio data compression circuit 104 under the control of the packet size control circuit 108 to be described later, and loads PTS supplied from the audio data compression circuit 104 in the header field (PES header) of each packet (PES packet). A packetized elementary stream (PES) constituted of the PES packets is supplied to the multiplex transmission packeting circuit 110.

The compressed video data pocketing circuit 109 packetizes VES supplied from the video data compression circuit 106 in the unit of VAU, and loads PTS supplied from the video data compression circuit 106 in the header field of each packet. A PES constituted of the packets is supplied to the multiplex transmission packeting circuit 110.

The multiplex transmission packeting circuit 110 cuts off each PES supplied from the compressed audio and video data packeting circuits 107 and 109 to have a size suitable for the transmission path 300 and form a transmission packet (TS packet). The header field (TSP header) of each TS packet is loaded with program identification information (PID (Packet Identification) information for identifying whether the packet is video or audio data), PCR supplied from the reference time generation circuit 103, and other information. A transport stream (TS) constituted of TS packets with the header information is supplied to the modulation circuit 111.

According to ISO/IEC 13818-1, it stipulates that although it is not necessarily required to load PCR in each TS packet, PCR is required to be loaded and transmitted at least once per 100 ms.

The modulation circuit 111 modulates TS supplied from the multiplex transmission packeting circuit 110 so as to make it suitable for the characteristics of the transmission path 300, and supplies the modulated TS to the decoder unit 200 over the transmission path 300. The transmission path 300 may be a recording medium such as a tape, a wired path, a wireless path, or the like.

Upon reception of the modulated TS, the demodulation circuit 201 of the decoder unit 200 demodulates the TS and supplies the demodulated TS to the multiplex data separation circuit 202.

The multiplex data separation circuit 202 checks PID contained in each TS packet of TS supplied from the demodulation circuit 201. If PID indicates audio data, data in a data field (pay load) of the TS packet is supplied to the compressed audio data depacketing circuit 203. If PID indicates video data, data in the data field of the TS packet is supplied to the compressed video data depacketing circuit 204.

The multiplex data separation circuit 202 also derives PCR from each TS packet of TS supplied from the demodulation circuit 201, and supplies it to the reference time recovery circuit 205.

The compressed audio data depacketing circuit 203 extracts PTS from the data supplied from the multiplex data separation circuit 202, and supplies it to the audio data decoding circuit 206.

The compressed audio data depacking circuit 203 also recovers AAU from the data supplied from the multiplex data separation circuit 202, and supplies it to the audio data decoding circuit 206.

The compressed video data depacketing circuit 204 derives PTS from the data supplied from the multiplex data separation circuit 202, and supplies it to the video data decoding circuit 207.

The compressed audio data depacking circuit 204 also recovers VAU from the data supplied from the multiplex data separation circuit 202, and supplies it to the video data decoding circuit 207.

The reference time recovery circuit 205 generates a system clock from PCR supplied from the multiplex data separation circuit 202, by using a PLL or the like, to thereby recover PCR which was intermittently received. The reference time recovery circuit 205 supplies the recovered PCR to the audio and video data decoding circuits 206 and 207.

The audio data decoding circuit 206 decodes (expands) AAU supplied from the compressed audio data depacketing circuit 203 to obtain digital audio data. The audio data decoding circuit 206 compares PTS supplied from the compressed audio data depacketing circuit 203 with PCR supplied from the reference time recovery circuit 205, and at a timing determined by the comparison result, converts the digital audio data into analog audio data which is output as an audio signal via the output terminal 208.

The video data decoding circuit 207 decodes (expands) VAU supplied from the compressed video data depacketing circuit 204 to obtain digital video data. The video data decoding circuit 207 compares PTS supplied from the compressed video data depacketing circuit 204 with PCR supplied from the reference time recovery circuit 205, and at a timing determined by the comparison result, converts the digital video data into analog video data which is output as a video signal via the output terminal 209.

The monitor unit 400 receives the audio and video data decoded by the decoder unit 200 and outputs it.

A series of operations of the digital transmission system has been described above.

Next, packeting audio data under the control of the packet size control circuit, which is the most characteristic feature of the digital transmission system, will be specifically described.

First, the audio data compression circuit 104 compresses audio data at a compression factor designated by the compression control circuit 105 to thereby generate AAU, in accordance with a predetermined scheme (e.g., ISO/IEC 11172-3), and outputs AES constituted of generated AAU's. Therefore, the audio data compression circuit 104 outputs AES constituted of, for example, AAU0, AAU1, AAU2, ... as shown in FIG. 3A. At the same time, the audio data compression circuit 104 also outputs PTS.

Next, the compressed audio data pocketing circuit 107 packetizes AES output from the audio data compression circuit 104, and loads PTS output from the audio data compression circuit 104 in the header field (PES header) of each packet (PES packet). Packetizing at this time is executed under the control of the packet size control circuit 108.

More specifically, the packet size control circuit 108 determines the packet length of a PES packet corresponding to AES having the compression factor designated by the compression control circuit 105 and set at the audio data compression circuit 104.

AAU is a data train compressed by using audio data of 24 ms as one unit. According to ISO/IEC 111723, it stipulates that although it is not necessarily required to load PTS in each PES header, PTS is required to be loaded and transmitted at least once per 700 ms.

Therefore, the packet size control circuit 108 determines "m" which makes a calculation result of the following formula (1) have "0" or a "positive" value nearest to "0".

The packet size control circuit 108 supplies this value "m" to the compressed audio data packeting circuit 107, as information on the number of AAU's to be packetized.

$$TSd*n - (AAUd*m + Lpesh) \quad (1)$$

where TSd is the number of pay loads of the TS packet, AAUd is the data length of AAU, Lpesh is the data length of PES, n is an arbitrary integer, and m is an integer which satisfies m×24 ms<700 ms.

The packet size control circuit 108 supplies the determined "m" to the compressed audio data packeting circuit 107.

The packet size control circuit 108 may determine "m" by calculating the formula (1) or may determine it by using a table which stores a correspondence between each compression factor and "m".

Therefore, as shown in FIG. 3B, the compressed audio data packeting circuit 107 packetizes AAU's in the unit of the number (in the example shown in FIG. 3B, m=2) of AAU's designated by the packet size control circuit 108, loads PTS in the header field (PES header) of each packet (PES packet), and outputs it as PES.

The multiplex transmission packeting circuit 110 further packetizes PES output from the compressed audio data packeting circuit 107, as shown in FIG. 3C, to have the size of a fixed length suitable for the transmission path 300, and outputs it as TS.

If the calculation result of the formula (1) made by the packet size control circuit 108 to determine the number of AAU's contained in a PES packet, i.e., the value of "m", is not "0", the multiplex transmission packeting circuit 110 packetizes a PES packet into TS packets by adding, if necessary, staff data to the last TS packet in order to make the last TS packet have the fixed length. In this case, however, since the compressed audio data pocketing circuit 107 packetizes AES into PES packets under the control of the packet size control circuit 108, the amount of staff data can be made minimum.

With the above configuration, a redundancy can be reduced when PES constituted of fixed length data such sa AAU is packetized into a TS packet having a fixed length.

The present invention may be applied to a system constituted of a plurality of apparatuses (e.g., a host computer, interface units, a reader, a printer, and the like) or to a system constituted of a single apparatus (e.g., a digital VTR, a digital camera, a digital television or the like). Namely, the invention is applicable to a partially or wholly integrated combination of the camera unit 10, encoder unit 100, decoder unit 200 and monitor unit 400.

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disk, a hard disk, an optical disk, a magneto-optical disk, a CD-ROM, a magnetic tape, a nonvolatile memory card, a ROM, and the like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A data processing apparatus comprising:
   a) input means for inputting data;
   b) encoding means for compression-encoding the data;
   c) first packetizing means for receiving from a packet size control means data length information for controlling a length of a first data train and for packetizing the data encoded by said encoding means into the first data train in accordance with the received data length information; and
   d) second packetizing means for packetizing the first data train generated by said first packetizing means into a second data train,
   wherein said encoding means compression-encodes the data on a basis of a predetermined data length, and said control means controls the first data train length in accordance with the predetermined encoding data length and the data length information, and
   wherein said control means controls the first data length to have a value being equal to N (N: integer) times the predetermined encoding data length and near to a value not exceeding L (L: integer) times the data length information.

2. A data processing apparatus comprising:
   a) input means for inputting data;
   b) encoding means for compression-encoding the data;
   c) first packetizing means for receiving from a packet size control means data length information for controlling a length of a first data train and for packetizing the data encoded by said encoding means into the first data train in accordance with the received data length information;
   d) second packetizing means for packetizing the first data train generated by said first packetizing means into a second data train;
   e) reference time information generation means for generating reference time information; and
   f) time management information generation means for generating time management information representative of an input time of the data to said input means, in accordance with the reference time information,
   wherein said first packetizing means adds the time management information to the first data train based upon a first period, and said second packetizing means adds the reference time information to the second data train based upon a second period,
   wherein said encoding means compression-encodes the data on a basis of a predetermined data length, and said control means controls the first data train length in accordance with the predetermined encoding data length and the data length information, wherein said control means controls the first data length in accordance with the time management information, and wherein said control means controls the first data length to maximize the predetermined encoding data length satisfying the first period and have a value being equal to a minimum common multiple of the predetermined encoding data length and the data length information or being equal to N (N: integer) times the predetermined encoding data length and near to a value not exceeding L (L: integer) times the data length information.

* * * * *

UNITED STATES PATENT AND TRADEMARK OFFICE
CERTIFICATE OF CORRECTION

PATENT NO. : 6,970,472 B2  
APPLICATION NO. : 09/314122  
DATED : November 29, 2005  
INVENTOR(S) : Takayuki Kikuchi Page 1 of 1

It is certified that error appears in the above-identified patent and that said Letters Patent is hereby corrected as shown below:

COLUMN 1:  
Line 26, "Equipments" should read -- Equipment --; and  
Line 27, "main stream." should read --mainstream.--.

COLUMN 2:  
Line 31, "more than conventional an" should be deleted.

COLUMN 7:  
Line 6, "pay loads" should read -- payloads --; and  
Line 40, "sa" should read -- as --.

COLUMN 8:  
Line 17, "specifications" should read -- specification --; and  
Line 18, "fall" should read -- falling --.

Signed and Sealed this

Fourteenth Day of November, 2006

JON W. DUDAS  
*Director of the United States Patent and Trademark Office*